(12) United States Patent
Noguchi et al.

(10) Patent No.: US 12,003,160 B2
(45) Date of Patent: Jun. 4, 2024

(54) EDDY CURRENT DECELERATION DEVICE

(71) Applicant: NIPPON STEEL CORPORATION, Tokyo (JP)

(72) Inventors: Yasutaka Noguchi, Tokyo (JP); Hiroshi Nogami, Tokyo (JP); Kenji Imanishi, Tokyo (JP); Takuya Fujita, Tokyo (JP); Yozo Okuda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 135 days.

(21) Appl. No.: 17/904,449

(22) PCT Filed: Feb. 10, 2021

(86) PCT No.: PCT/JP2021/004878
§ 371 (c)(1),
(2) Date: Aug. 17, 2022

(87) PCT Pub. No.: WO2021/176977
PCT Pub. Date: Sep. 10, 2021

(65) Prior Publication Data
US 2023/0089505 A1  Mar. 23, 2023

(30) Foreign Application Priority Data
Mar. 6, 2020 (JP) ................................. 2020-038331

(51) Int. Cl.
*H02K 49/04* (2006.01)

(52) U.S. Cl.
CPC ................................. *H02K 49/043* (2013.01)

(58) Field of Classification Search
CPC ....... H02K 49/00; H02K 49/04; H02K 49/043

USPC ................................. 310/75 R, 112, 113, 114
See application file for complete search history.

(56) References Cited

U.S. PATENT DOCUMENTS

| | | | | |
|---|---|---|---|---|
| 5,925,952 A | * | 7/1999 | Bichler | F16F 15/315 310/90.5 |
| 2003/0102756 A1 | * | 6/2003 | Kusase | H02K 1/27 310/156.53 |
| 2006/0060691 A1 | * | 3/2006 | Burns | F41J 9/10 244/1 TD |
| 2006/0138879 A1 | * | 6/2006 | Kusase | H02K 21/22 310/156.43 |
| 2008/0143114 A1 | * | 6/2008 | Kusase | F02N 11/02 290/48 |

(Continued)

FOREIGN PATENT DOCUMENTS

| | | |
|---|---|---|
| JP | 2001078425 A | 3/2001 |
| JP | 2013521749 A | 6/2013 |
| WO | 2011137993 A2 | 11/2011 |

*Primary Examiner* — Rashad H Johnson
(74) *Attorney, Agent, or Firm* — Greer Burns & Crain Ltd.

(57) ABSTRACT

An eddy current deceleration device includes a rotor and a stator. The rotor includes a hub, a rotor body, and a spoke. The spoke has neutral axes. The first neutral axis is a neutral axis when the spoke is bent in a circumferential direction of the rotor body. The first neutral axis is positioned forward in a rotating direction of the rotor with respect to a center line of the spoke in the circumferential direction. The second neutral axis is a neutral axis when the spoke is bent in an axial direction of the rotor body. The second neutral axis is positioned on a rotor body side with respect to a center line of the spoke in the axial direction.

4 Claims, 10 Drawing Sheets

(56) References Cited

U.S. PATENT DOCUMENTS

| | | | | |
|---|---|---|---|---|
| 2013/0193782 A1* | 8/2013 | Kusase | ............... | H02K 7/112 |
| | | | | 310/46 |
| 2014/0159533 A1* | 6/2014 | Kondou | ............... | H02K 3/12 |
| | | | | 310/156.53 |
| 2016/0099618 A1* | 4/2016 | Kusase | ............... | H02K 16/02 |
| | | | | 310/46 |
| 2016/0164386 A1* | 6/2016 | Kusase | ............... | H02K 16/04 |
| | | | | 310/156.01 |
| 2016/0352203 A1* | 12/2016 | Kusase | ............... | H02K 19/12 |

* cited by examiner

EDDY CURRENT DECELERATION DEVICE

TECHNICAL FIELD

The present disclosure relates to an eddy current deceleration device.

BACKGROUND ART

As auxiliary brakes of large vehicles such as trucks and buses, eddy current deceleration devices have been used. For example, as disclosed in Patent Literature 1, an eddy current deceleration device includes a rotor fixed to a rotation shaft of a vehicle and a stator fixed to a non-rotating part of the vehicle. The rotor includes a hub attached to the rotation shaft and a rotor body, which is a cylindrical electric conductor. One end portion of the rotor body in its axial direction is connected to the hub via a plurality of spokes. The stator holds, inside the rotor body, a plurality of magnets arranged in a circumferential direction of the rotor body.

A rotor of an eddy current deceleration device rotates with a rotation shaft of a vehicle and is subjected to air resistance. In Patent Literature 2, a transverse sectional shape of spokes connecting a rotor body to a hub is designed to reduce the air resistance. More specifically, in Patent Literature 2, the transverse section of the spokes has a shape in which a length in an axial direction of the rotor body is significantly smaller than a length in a circumferential direction of the rotor body. According to Patent Literature 2, such a transverse sectional shape makes at least part of each of the spokes flat, and therefore the air resistance in the rotation of the rotor can be reduced.

CITATION LIST

Patent Literature

Patent Literature 1: Japanese Patent Application Publication No. 2001-78425
Patent Literature 2: Japanese Translation of PCT International Application Publication No. 2013-521749

SUMMARY OF INVENTION

Technical Problem

When an eddy current deceleration device is in a state of turned on (braking state), a rotor body, which is an electric conductor, rotates within magnetic fields produced by a row of magnets and thereby eddy currents are generated on the rotor body. The eddy currents and the magnetic fields interact with each other to generate a braking force in an opposite direction to a rotating direction in the rotor body. At this time, a bending load in a circumferential direction of the rotor body is applied to each of spokes fixed to the rotor body. That is, the braking force in the opposite direction to the rotating direction acting on the rotor body applies the bending load in the opposite direction to the rotating direction to the spokes. Each of the spokes is thereby subjected to such bending that its front portion in the rotating direction expands while its rear portion in the rotating direction contracts.

In contrast, when the eddy current deceleration device is in a state of turned off (non-braking state), no magnetic fields act on the rotor body, and the braking force is not generated. Therefore, the bending load in the circumferential direction of the rotor body is not applied to each of the spokes. By repeating switching between the braking state and the non-braking state, the bending load in the circumferential direction is applied to the spokes repeatedly.

Further, when the eddy current deceleration device is in the braking state, Joule's heat is produced in the rotor body on which eddy currents flow, and a temperature of the rotor body rises. This causes thermal expansion of the rotor body to increase its diameter. At this time, at one end portion of the rotor body in the axial direction, the deformation is restrained by the spokes fixed thereto. In contrast, the other end portion of the rotor body in the axial direction is allowed to deform freely because the spokes are not fixed thereto. Thus, in the rotor body, a diameter of the end portion on an opposite side to a spoke becomes larger than a diameter of the end portion on the spoke side. As a result, a bending load in the axial direction of the rotor body is applied to each of the spokes. Each of the spokes is subjected to such bending that its portion on a rotor body side expands while its portion on an opposite side to the rotor body contracts.

When the eddy current deceleration device is switched from the braking state to the non-braking state, the temperature of the rotor body drops, and the rotor body contracts to its original shape. Therefore, the bending load in the axial direction of the rotor body is not applied to each of the spokes. By repeating switching between the braking state and the non-braking state, the bending load in the axial direction is applied to the spokes repeatedly.

In this manner, bending loads in a circumferential direction and an axial direction of a rotor body are applied to spokes repeatedly. However, for conventional eddy current deceleration devices as exemplified in Patent Literatures 1 and 2, no particular consideration is given to bending loads in a circumferential direction and an axial direction applied to spokes. From a viewpoint of a durability of an eddy current deceleration device, it is preferable to prevent or reduce fatigue damage to spokes by giving consideration to both bending loads in a circumferential direction and an axial direction applied to the spokes.

An objective of the present disclosure is to improve a durability of an eddy current deceleration device by preventing or reducing fatigue damage to its spoke.

Solution to Problem

An eddy current deceleration device according to the present disclosure includes a rotor and a stator. The rotor includes a hub, a rotor body, and a spoke. The hub is attached to a rotation shaft. The rotor body has a cylindrical shape. The spoke extends from the hub to the rotor body and is fixed to one end portion of the rotor body in its axial direction. The rotor is configured to rotate with the rotation shaft. The stator is disposed inside or outside of the rotor body. The spoke has a first neutral axis and a second neutral axis. The first neutral axis is a neutral axis when the spoke is bent in a circumferential direction of the rotor body. The first neutral axis is positioned forward in a rotating direction of the rotor with respect to a center line of the spoke in the circumferential direction. The second neutral axis is a neutral axis when the spoke is bent in the axial direction of the rotor body. The second neutral axis is positioned on a rotor body side with respect to a center line of the spoke in the axial direction.

Advantageous Effect of Invention

According to the present disclosure, fatigue damage to spoke can be prevented or reduced, which in turn enables an improvement in durability of an eddy current deceleration device.

DESCRIPTION OF EMBODIMENT

Figure 8:
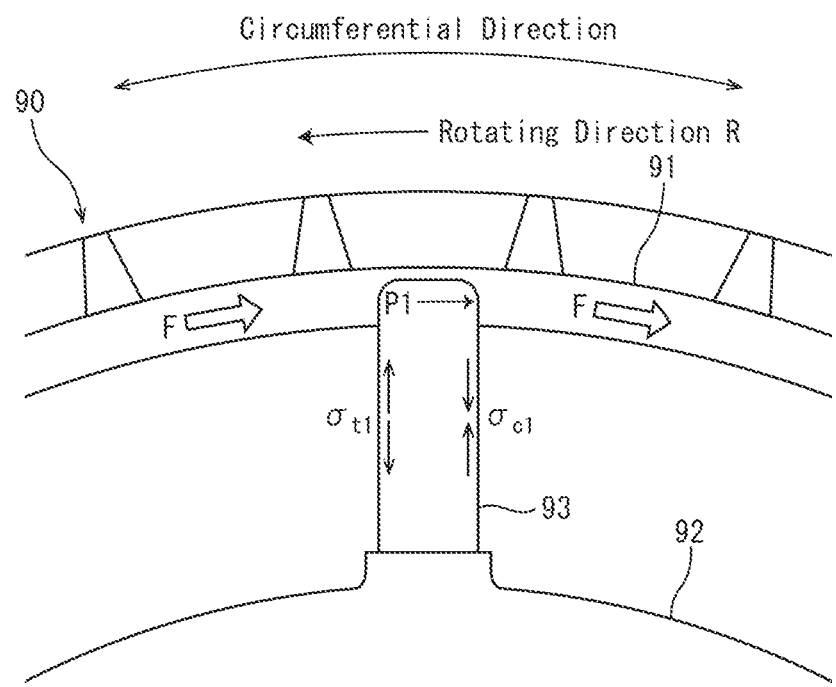
FIG. 8 is a schematic diagram for explaining a bending load in a circumferential direction applied to a spoke in a rotor of an eddy current deceleration device.
Figure 9:
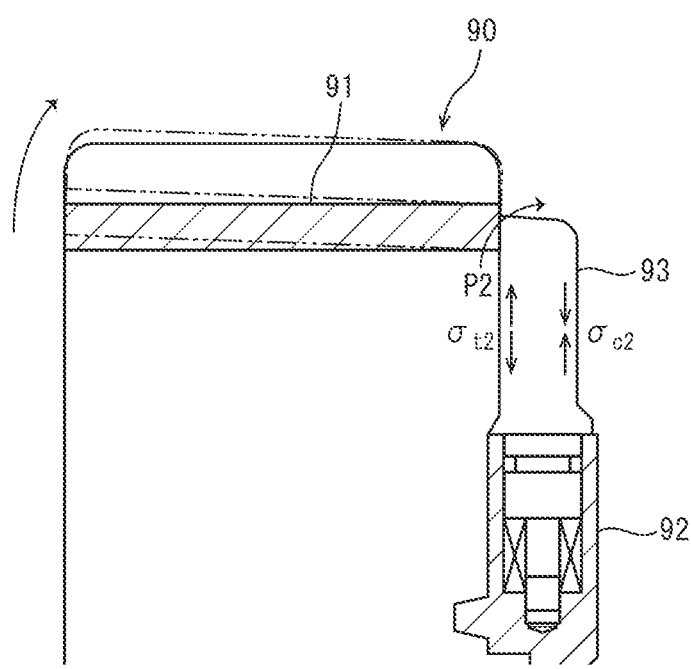
FIG. 9 is a schematic diagram for explaining a bending load in an axial direction applied to a spoke in a rotor of an eddy current deceleration device.

As described above, when an eddy current deceleration device is in a braking state, bending loads in a circumferential direction and an axial direction of a rotor body are applied to spokes connecting the rotor body and a hub. FIG. 8 and FIG. 9 are each a schematic diagram for explaining a bending load applied to a spoke in a rotor of an eddy current deceleration device.

As illustrated in FIG. 8, in a rotor 90 of the eddy current deceleration device, when a braking force F in an opposite direction to a rotating direction R is generated in a rotor body 91, a bending load P1 in a circumferential direction of the rotor body 91 is applied to a spoke 93 that connects the rotor body 91 to a hub 92. The bending load P1 bends the spoke 93 in an opposite direction to the rotating direction R. Accordingly, in the spoke 93, a tensile stress $\sigma_{t1}$ occurs at its front portion in the rotating direction R of the rotor body 91, and a compressive stress $\sigma_{c1}$ occurs at its rear portion.

As illustrated with chain double-dashed lines in FIG. 9, when thermal expansion of the rotor body 91 occurs to significantly increase a diameter relatively at an end portion of the rotor body 91 on an opposite side to the spoke 93, a bending load P2 in an axial direction of the rotor body 91 is applied to the spoke 93. The bending load P2 bends the spoke 93 toward an opposite side to the rotor body 91 in the axial direction. Accordingly, in the spoke 93, a tensile stress $\sigma_{t2}$ occurs at its portion on a rotor body 91 side, and a compressive stress $\sigma_{c2}$ occurs at its portion on the opposite side to the rotor body 91. When the eddy current deceleration device is switched from the braking state to a non-braking state, the bending loads P1 and P2 and the stresses $\sigma_{t1}$, $\sigma_{t2}$, $\sigma_{c1}$, and $\sigma_{c2}$ are removed.

In this manner, in the spoke, only a tensile stress repeatedly occurs at one portion, and only a compressive stress repeatedly occurs at another portion. That is, the spoke is subjected to what is called a pulsating fatigue load.

In a case where a pulsating fatigue load is applied to a material, a fatigue life of the material is shorter when the fatigue load is a tensile stress than when the fatigue load is a compressive stress even if an absolute value of the tensile stress and an absolute value of the compressive stress are the same. For example, at a portion of a material where only a tensile stress repeatedly occurs, a crack is likely to develop, and the crack having developed is likely to grow. In contrast, at a portion of a material where only a compressive stress repeatedly occurs, a crack is unlikely to develop, and the crack having developed is unlikely to grow. The present inventors therefore paid attention to tensile stress and studied a shape of a spoke capable of reducing tensile stress even when compressive stress is increased.

When a rod-shaped member such as a spoke is bent, a tensile stress occurs at a region in the member where the member is expanded by the bending, and a compressive stress occurs at a region in the member where the member is contracted by the bending. Between these regions, there is a neutral plane that is neither expanded nor contracted. A line of intersection between the neutral plane and a cross section of the member perpendicular to the neutral plane is called a neutral axis. The stresses occurring when the member is bent increase with increases in distances from the neutral axis. Accordingly, when a spoke is bent in a circumferential direction of a rotor body by a braking force generated in the rotor body, in the spoke, a tensile stress is greater at its portion farther forward in a rotating direction of the rotor than a neutral axis when the spoke is bent in the circumferential direction, and a compressive stress is greater at its portion farther rearward than the neutral axis. In order to reduce a maximum value of the tensile stress, in the spoke, a distance from the neutral axis when the spoke is bent in the circumferential direction to a surface of the spoke on a front side in the rotating direction may be shortened.

When a spoke is bent in an axial direction of a rotor body by thermal expansion of the rotor body, in the spoke, a tensile stress is greater at its portion farther toward a rotor body side than a neutral axis when the spoke is bent in the axial direction, and a compressive stress is greater at its portion farther toward an opposite side to the rotor body than the neutral axis. In order to reduce a maximum value of the tensile stress, in the spoke, a distance from the neutral axis when the spoke is bent in the axial direction to a surface of the spoke on the rotor body side may be shortened.

Based on the findings described above, the present inventors completed an eddy current deceleration device according to an embodiment.

An eddy current deceleration device according to an embodiment includes a rotor and a stator. The rotor includes a hub, a rotor body, and a spoke. The hub is attached to a rotation shaft. The rotor body has a cylindrical shape. The spoke extends from the hub to the rotor body and is fixed to one end portion of the rotor body in its axial direction. The rotor is configured to rotate with the rotation shaft. The stator is disposed inside or outside of the rotor body. The spoke has a first neutral axis and a second neutral axis. The first neutral axis is a neutral axis when the spoke is bent in a circumferential direction of the rotor body. The first neutral axis is positioned forward in a rotating direction of the rotor with respect to a center line of the spoke in the circumferential direction. The second neutral axis is a neutral axis when the spoke is bent in the axial direction of the rotor body. The second neutral axis is positioned on a rotor body side with respect to a center line of the spoke in the axial direction (first configuration).

In the rotor of the eddy current deceleration device according to the first configuration, the spoke has a first neutral axis that is a neutral axis when the spoke is bent in the circumferential direction of the rotor body. The first neutral axis is positioned forward in the rotating direction of the rotor with respect to the center line of the spoke in the circumferential direction of the rotor body. As a result, in the spoke, a distance from the first neutral axis to a surface on a front side in the rotation direction is shorter as compared with a case where the first neutral axis coincides with the center line in the circumferential direction. Therefore, when a bending load in the circumferential direction is applied to the spoke by a braking force generated in the rotor body, a maximum value of a tensile stress occurring in the spoke can be reduced.

Further, the spoke has a second neutral axis that is a neutral axis when the spoke is bent in the axial direction of the rotor body. The second neutral axis is positioned on a rotor body side with respect to the center line of the spoke in the axial direction of the rotor body. As a result, in the spoke, a distance from the second neutral axis to a surface on the rotor body side in the axial direction is shorter as compared with a case where the second neutral axis coincides with the center line in the axial direction. Therefore, when a bending load in the axial direction is applied to the spoke by thermal expansion of the rotor body, a maximum value of a tensile stress occurring in the spoke can be reduced.

In this manner, with the first configuration, both the tensile stress occurring in the spoke when the spoke is bent in the circumferential direction of the rotor body and the tensile stress occurring in the spoke when the spoke is bent in the axial direction of the rotor body can be reduced at the same time in use of the eddy current deceleration device. Therefore, fatigue damage to the spoke can be prevented or reduced, and a fatigue life of the spoke can be prolonged. As a result, a durability of the eddy current deceleration device can be improved.

An eddy current deceleration device is required to have a reduced size and weight from viewpoints of improvement in mountability in a vehicle, improvement in fuel efficiency of a vehicle, and the like. In order to reduce an eddy current deceleration device in size and weight, its spoke also needs to be reduced in size. With the first configuration, the spoke is made resistant to fatigue damage, and thus the spoke can be reduced in size. As a result, the eddy current deceleration device can be reduced in size and weight.

An eddy current deceleration device is required to generate a high braking force to make up for an insufficient braking performance of a vehicle having a large loading capacity, for example. In an eddy current deceleration device that is made to generate a high braking force, the high braking force and a large amount of generation of heat with the braking force increase a bending load applied to a spoke, and thus the spoke is likely to be subjected to fatigue damage. In contrast, with the first configuration, tensile stresses that occur in the spoke when bending loads in the circumferential direction and the axial direction of the rotor body are applied to the spoke are reduced, and thus the fatigue damage to the spokes can be prevented or reduced. As a result, the eddy current deceleration device according to the first configuration can support generating a high braking force.

In the eddy current deceleration device according to the embodiment, a surface of the spoke on the rotor body side is preferably a flat surface that is perpendicular to the axial direction of the rotor body (second configuration).

With the second configuration, the surface of the spoke on the rotor body side is a flat surface that is substantially perpendicular to the axial direction of the rotor body. That is, the surface of the spoke on the rotor body side is substantially constituted by a flat surface without a protruding or raised portion. Therefore, the spoke can be brought close to the stator disposed inside or outside of the rotor body. As a result, a dimension of the eddy current deceleration device in the axial direction can be decreased.

The spoke preferably has a transverse section in which a length in the axial direction of the rotor body decreases as the transverse section extends rearward in the rotating direction of the rotor (third configuration).

With the third configuration, the transverse section of the spoke is formed such that its length in the axial direction decreases as the transverse section extends rearward in the rotating direction of the rotor. This makes air flows rearward in the rotating direction along the surface of the spoke resistant to being separated from the surface while the rotor rotates, and thus air resistance acting on the spoke can be reduced.

An embodiment of the present disclosure will be described below with reference to the drawings. In the drawings, the same or equivalent components will be denoted by the same reference numerals, and description of the parts will not be repeated.

[Configuration of Eddy Current Deceleration Device]

Figure 1:
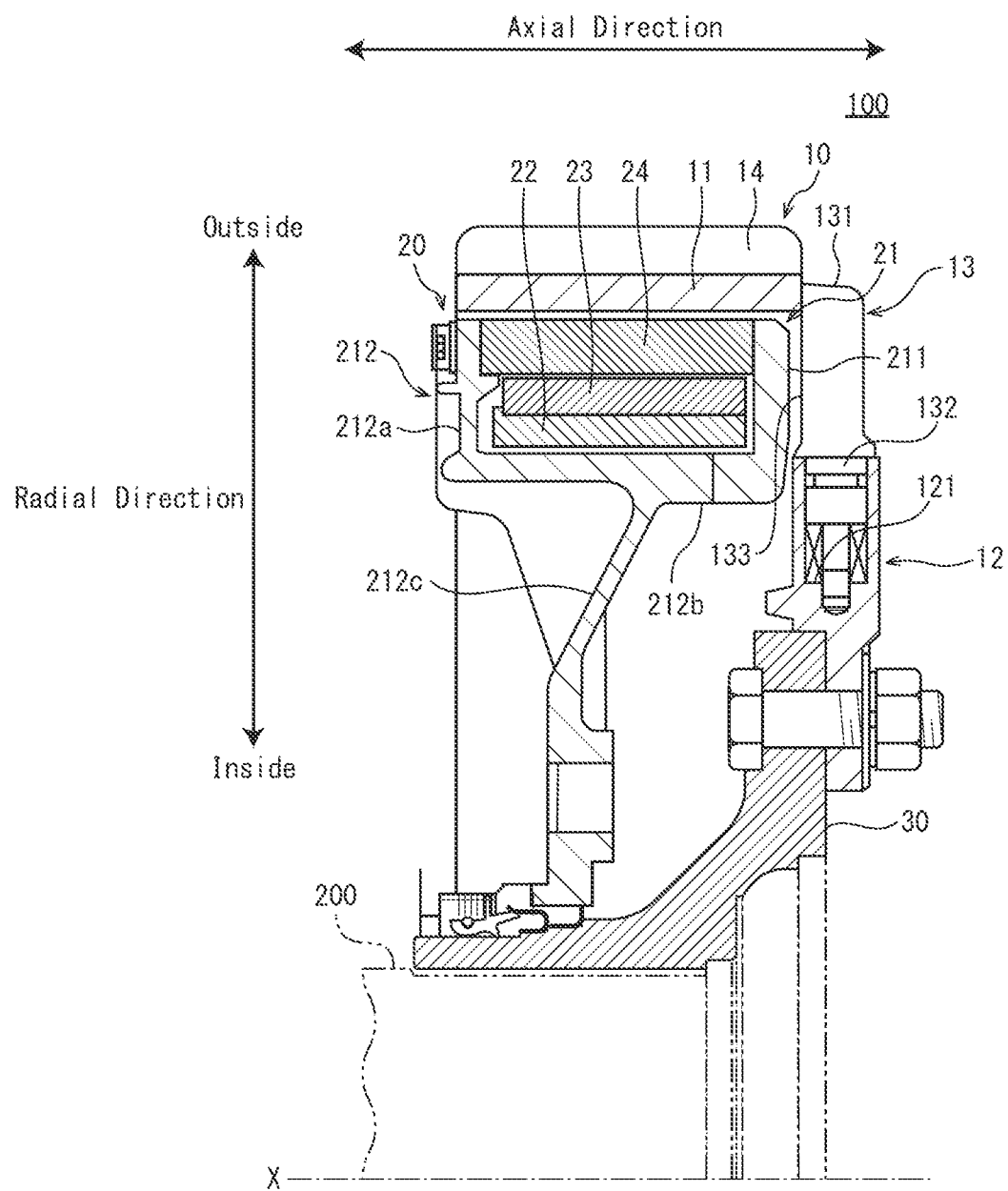
FIG. 1 is a cross-sectional view illustrating a schematic configuration of an eddy current deceleration device according to an embodiment.

FIG. 1 is a longitudinal sectional view illustrating a schematic configuration of an eddy current deceleration device 100 according to the present embodiment. The deceleration device 100 is to be used, for example, as an auxiliary brake of a vehicle such as a truck and a bus. The longitudinal section refers to a cross section obtained by cutting the deceleration device 100 along a plane including a shaft center X of a rotation shaft 200 of a vehicle in which the deceleration device 100 is to be used. The rotation shaft 200 is, for example, a propeller shaft or a drive shaft. Hereinafter, a direction in which the shaft center X extends will be referred to as axial direction, and a circumferential direction and a radial direction of an annular ring or a cylinder centered about the shaft center X will be simply referred to as circumferential direction and radial direction, respectively.

With reference to FIG. 1, the deceleration device 100 includes a rotor 10 and a stator 20. The rotor 10 rotates about the shaft center X together with the rotation shaft 200 of the vehicle. The stator 20 is fixed to a non-rotating part of the vehicle such as a transmission cover so that the stator 20 does not rotate together with the rotation shaft 200.

The rotor 10 includes a rotor body 11, a hub 12, and a plurality of spokes 13. The rotor body 11 has a substantially cylindrical shape centered about the shaft center X of the rotation shaft 200. The rotor body 11 is made of, for example, ferromagnetic material such as carbon steel, low alloy steel, or cast steel. More specifically, the rotor body 11 is made of, for example, chromium-molybdenum steel or low alloy steel casting. Further, the rotor body 11 may be made of, for example, a steel containing, in percentage by weight, C: 0.05 to 0.15%, Si: 0.10 to 0.40%, Mn: 0.5 to 1.0%, P: 0.05% or less, Ni: 0.50% or less, Mo: 0.2 to 1.0%, Nb: 0.01 to 0.03%, V: 0.03 to 0.07%, B: 0.0005 to 0.003%, Sol.Al: 0.02 to 0.09%, and N: 0.01% or less, with the balance being substantially Fe. The material for the rotor body 11 is preferably a material having high heat resistance. An inner peripheral surface of the rotor body 11 may be coated with a copper plating layer, which has a high conductivity. On an outer peripheral surface of the rotor body 11, a plurality of radiation fins 14 are provided.

The hub 12 is disposed inside the rotor body 11 in the radial direction. The hub 12 is disposed with its position shifted from the rotor body 11 toward one side in the axial direction. The hub 12 has a substantially annular-disk shape centered about the shaft center X of the rotation shaft 200. The hub 12 is attached to the rotation shaft 200 via a supporting member 30. The hub 12 is, for example, steel-made, typically made of cast iron.

The plurality of spokes 13 are disposed radially around the hub 12. The spokes 13 extend in radial directions from the hub 12 to the rotor body 11. The spokes 13 connect the rotor body 11 to the hub 12 attached to the rotation shaft 200. The rotor body 11 therefore rotates about the shaft center X together with the rotation shaft 200, the hub 12, and the spokes 13. Between the rotor body 11 and the hub 12, for example, but not particularly limited to, about eight to ten spokes 13 are provided.

An end portion 131 of each spoke 13 on the outer side in the radial direction is fixed to one end portion of the rotor body 11 in the axial direction. An end portion 132 of each spoke 13 on the inner side in the radial direction is inserted into a recessed portion 121 that is provided on an outer peripheral surface of the hub 12. The end portion 132 is not fixed to the hub 12. In an example illustrated in FIG. 1, a surface 133 of the spoke 13 on a rotor body 11 side is a flat surface that is substantially perpendicular to the axial direction.

The spokes 13 are made of, for example, ferromagnetic material such as carbon steel or cast steel. More specifically, the spokes 13 are made of, for example, chromium-molybdenum steel or low alloy steel casting. The material for the spokes 13 is preferably a material having high strength. The material for the spokes 13 may be different from or the same as the material for the rotor body 11.

The stator 20 is disposed inside the rotor body 11 in the radial direction. The stator 20 includes a stator case 21, a magnet holding member 22, a plurality of permanent magnets 23, and a plurality of pole pieces 24.

The stator case 21 includes a case body 211, and a body holding member 212. The case body 211 is formed to have a substantially annular-disk shape centered about the shaft center X. The case body 211 faces the surface 133 of each spoke 13. A surface of the case body 211 on a spoke 13 side is preferably a flat surface that is substantially parallel to the surface 133 of the spoke 13. The case body 211 is fixed to the body holding member 212.

The body holding member 212 includes a side portion 212a that faces the case body 211 and a bottom portion 212b that protrudes from the side portion 212a toward the case body 211. The bottom portion 212b is attached to the non-rotating part of the vehicle via a supporting part 212c. The case body 211, and the side portion 212a and the bottom portion 212b of the body holding member 212 form a housing space inside the stator 20. In the housing space, the magnet holding member 22, the plurality of permanent magnets 23, and the plurality of pole pieces 24 are disposed.

The magnet holding member 22 has a cylindrical shape centered about the shaft center X. The magnet holding member 22 is disposed substantially coaxial with the rotor body 11. The magnet holding member 22 is made of, for example, ferromagnetic material such as carbon steel or cast steel.

The magnet holding member 22 is attached via, for example, a ring-shaped slide plate (not illustrated) in such a manner as to be slidable in the circumferential direction with respect to the stator case 21. The magnet holding member 22 is connected to a driving device (not illustrated) such as an air cylinder and an electric actuator, with a linkage (not illustrated). By operation of the driving device, the magnet holding member 22 rotates about the rotation shaft 200 and moves in the circumferential direction with respect to the stator case 21. By the rotation of the magnet holding member 22 about the rotation shaft 200, a braking state and a non-braking state are switched in the deceleration device 100.

Figure 2:
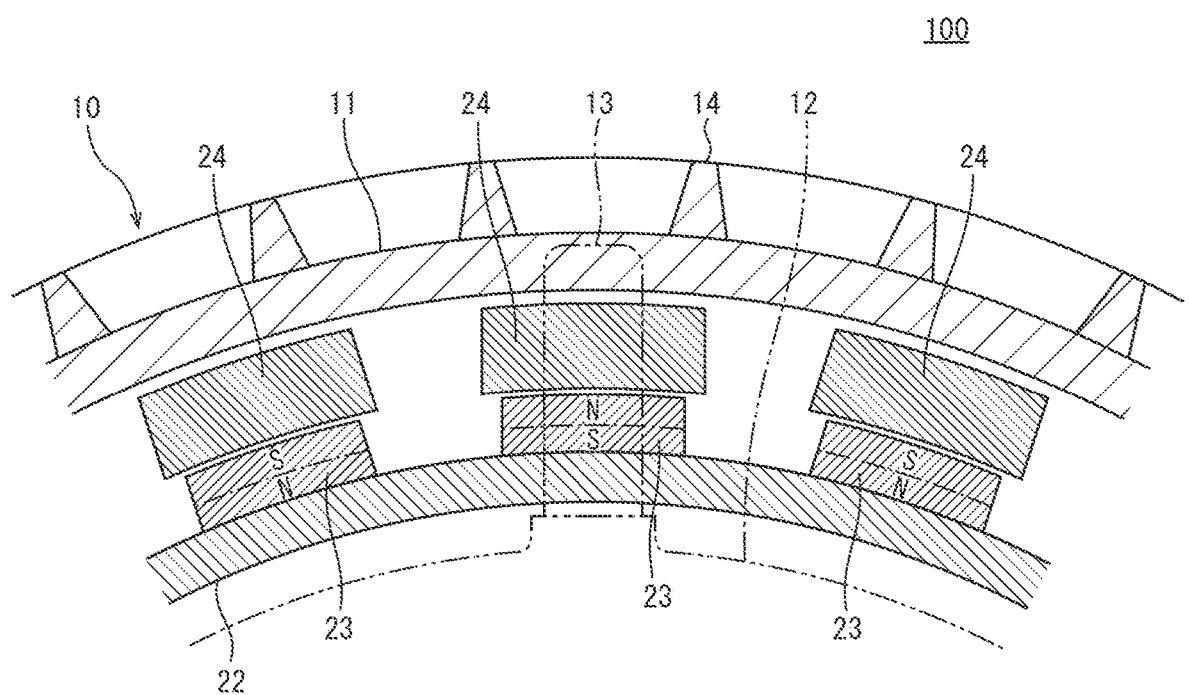
FIG. 2 is another cross-sectional view illustrating the schematic configuration of the eddy current deceleration device according to the embodiment.

FIG. 2 is a partial cross-sectional view of the deceleration device 100 obtained by cutting the deceleration device 100 along a plane perpendicular to the shaft center X of the rotation shaft 200. In FIG. 2, the stator case 21 is omitted.

As illustrated in FIG. 2, the magnet holding member 22 holds the plurality of permanent magnets 23 on its outer peripheral surface. The permanent magnets 23 are arranged in the circumferential direction at predetermined intervals. The permanent magnets 23 each are fixed to the outer peripheral surface of the magnet holding member 22 with, for example, adhesive. The permanent magnets 23 are, for example, neodymium magnets, ferrite magnets, or samarium-cobalt magnets.

The permanent magnets 23 each have a pair of magnetic poles (N pole, S pole). Each permanent magnet 23 has an orientation of the magnetic poles along a radial direction and the orientation of the magnetic poles is reversed from orientations of magnetic poles of its neighboring permanent magnets 23. That is, each permanent magnet 23 has an N pole or an S pole on its inner side in the radial direction and has an S pole or an N pole, which is an opposite pole, on its outer side in the radial direction.

The pole pieces 24 are made of, for example, ferromagnetic material such as carbon steel and cast steel. The pole pieces 24 are arranged in the circumferential direction at predetermined intervals between the rotor body 11 and the permanent magnets 23. In the example in the present embodiment, the number of the pole pieces 24 is equal to the number of the permanent magnets 23.

[Detailed Configuration of Rotor]

With reference to FIG. 3 and FIG. 4A to FIG. 4F, a configuration of the rotor 10 will be described below more in detail.

Figure 3:
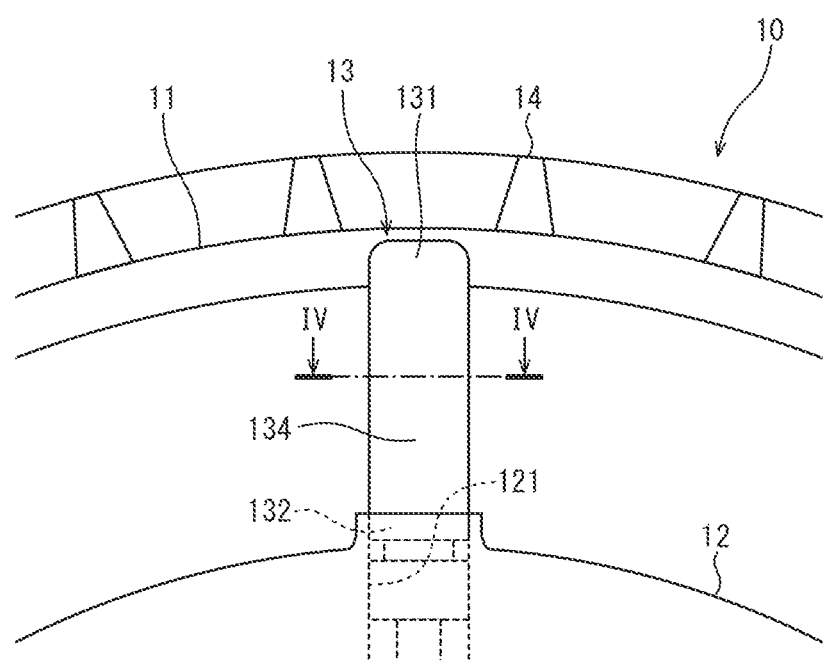
FIG. 3 is a diagram of a rotor included in the eddy current deceleration device illustrated in FIG. 1 and FIG. 2 when viewed from a spoke side.
Figure 4A:
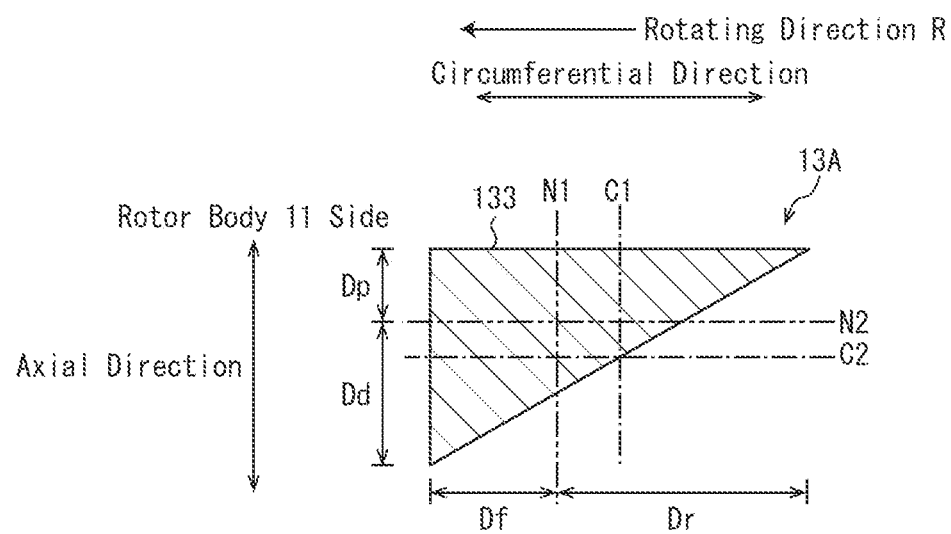
FIG. 4A is a diagram exemplifying a shape that can be adopted as a transverse sectional shape of a spoke used in the rotor illustrated in FIG. 3.
Figure 4B:
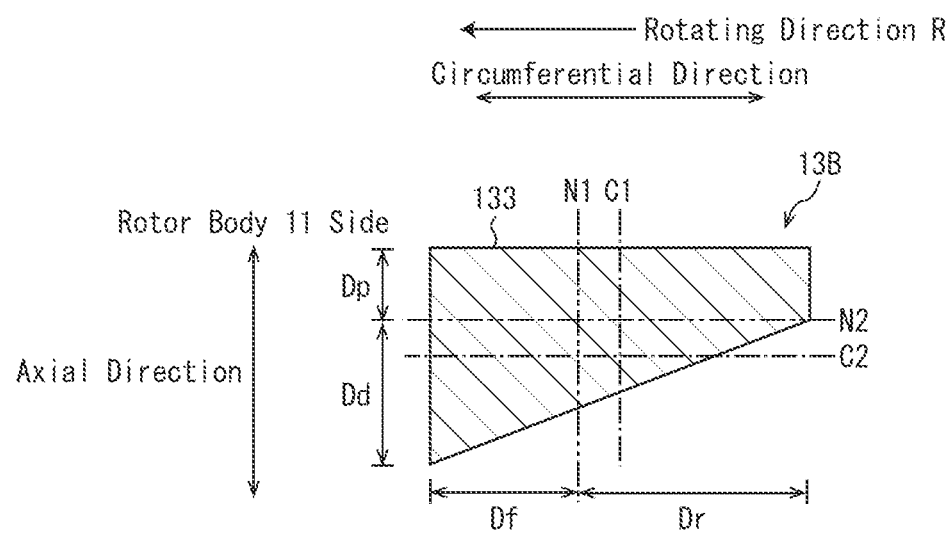
FIG. 4B is a diagram exemplifying a shape that can be adopted as a transverse sectional shape of a spoke used in the rotor illustrated in FIG. 3.
Figure 4C:
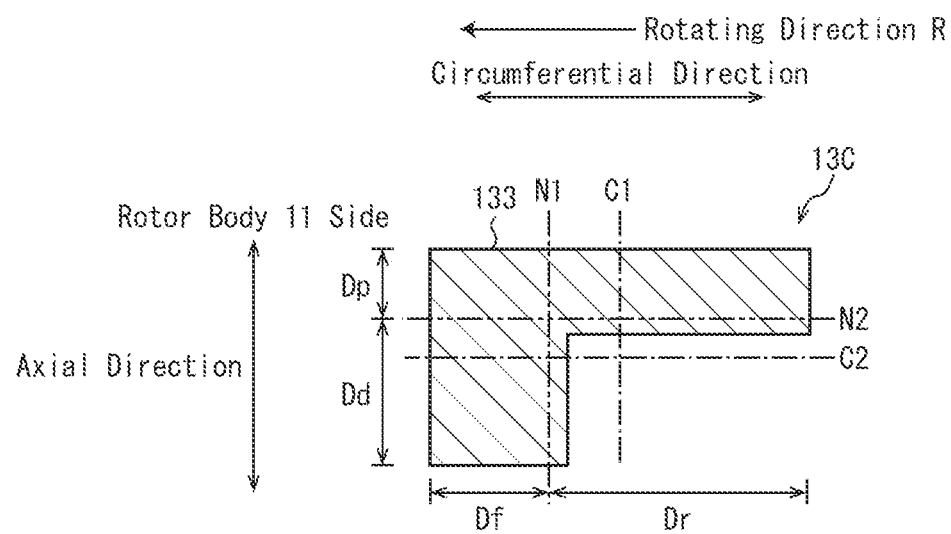
FIG. 4C is a diagram exemplifying a shape that can be adopted as a transverse sectional shape of a spoke used in the rotor illustrated in FIG. 3.
Figure 4D:
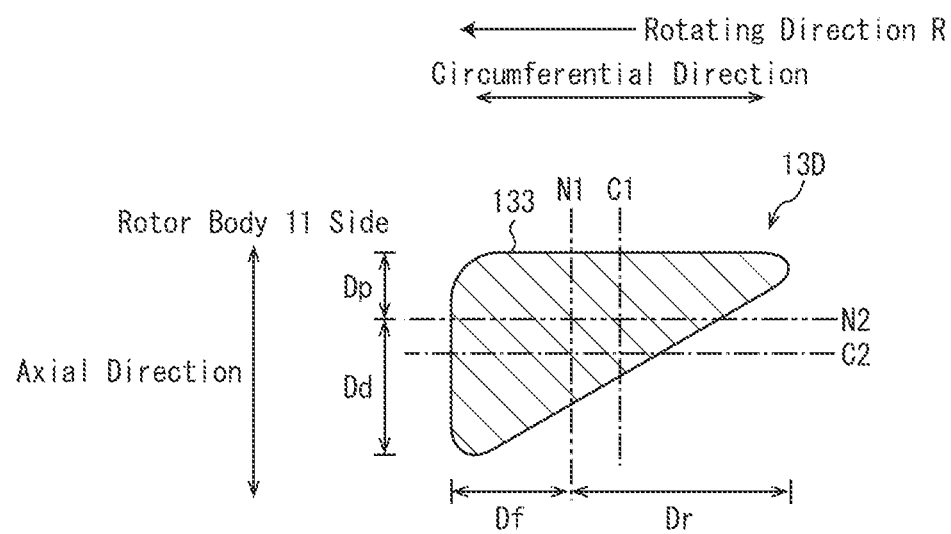
FIG. 4D is a diagram exemplifying a shape that can be adopted as a transverse sectional shape of a spoke used in the rotor illustrated in FIG. 3.
Figure 4E:
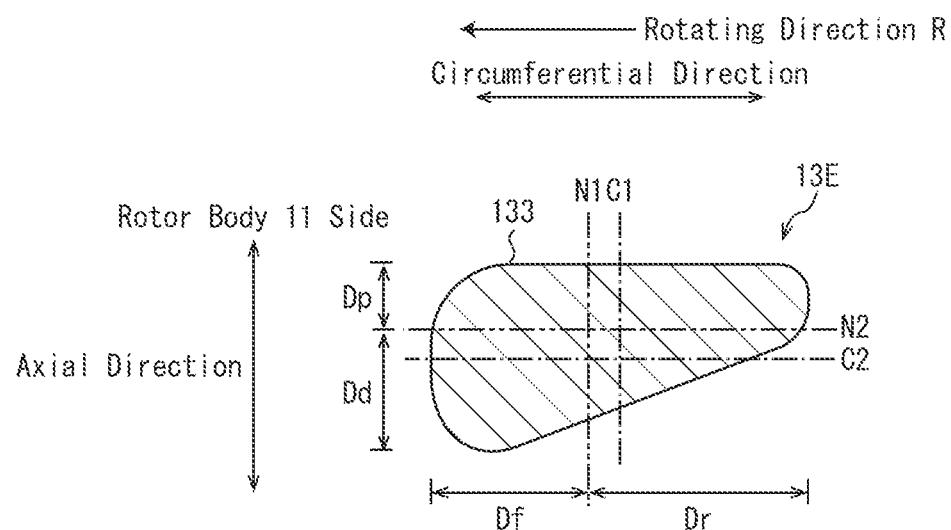
FIG. 4E is a diagram exemplifying a shape that can be adopted as a transverse sectional shape of a spoke used in the rotor illustrated in FIG. 3.
Figure 4F:
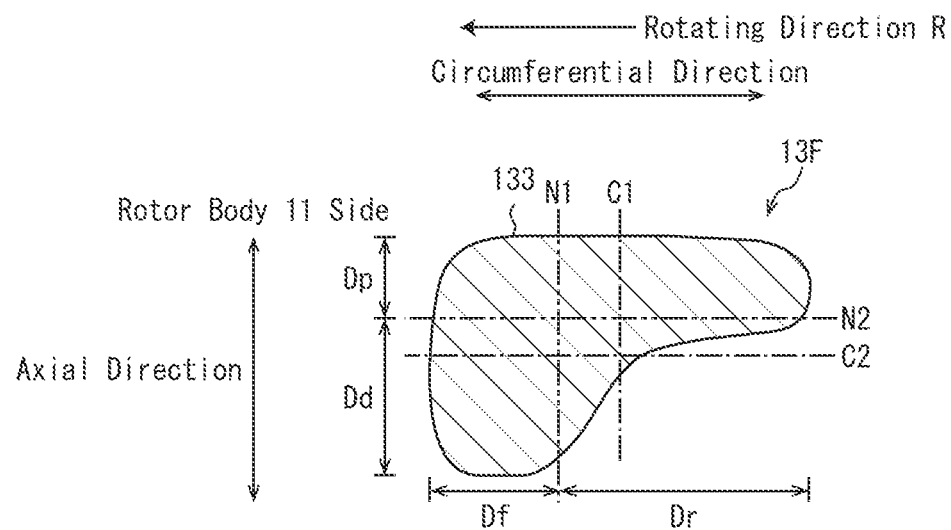
FIG. 4F is a diagram exemplifying a shape that can be adopted as a transverse sectional shape of a spoke used in the rotor illustrated in FIG. 3.

FIG. 3 is a diagram illustrating a part of the rotor 10 when viewed from a spoke 13 side. Referring to FIG. 3, a spoke 13 extends in the radial direction between the rotor body 11 and the hub 12. Of both end portions 131 and 132 of the spoke 13 in the radial direction, the end portion 131 on the outer side is fixed to an end face of the rotor body 11 having a cylindrical shape by, for example, welding. The end portion 132 on the inner side is inserted into the recessed portion 121 of the hub 12 such that the spoke 13 is movable in the radial direction with respect to the hub 12.

The spoke 13 has a transverse section in which a shape is uniform over its overall length in the radial direction or almost over the overall length. In the spoke 13, at least a portion 134, which is exposed from the hub 12 and is not fixed to the rotor body 11, has a transverse section with a constant shape. The transverse section of the spoke 13 refers to a cross section obtained by cutting the spoke 13 extending in the radial direction along a plane perpendicular to the radial direction. That is, a IV-IV cross section in FIG. 3 is a transverse section of the spoke 13.

FIG. 4A to FIG. 4F are each a diagram exemplifying a shape that can be adopted as a transverse sectional shape of the spoke 13 used in the rotor 10. Spokes 13A to 13F illustrated in FIG. 4A to FIG. 4F, respectively, have transverse sectional shapes different from one another. For example, any one of the spokes 13A to 13F is applied to the spoke 13.

Referring to FIG. 4A to FIG. 4F, a dashed line with a sign C1 is a center line of each of the spokes 13A to 13F in the circumferential direction (a center of a circumferential-direction width), and a dashed line with a sign C2 is a center line of each of the spokes 13A to 13F in an axial direction (a center in an axial-direction width). A chain double-dashed line with a sign N1 is a neutral axis of each of the spokes 13A to 13F when they are bent in the circumferential direction. In each of the spokes 13A to 13F, a line of intersection between the transverse section and a neutral plane where neither tensile stress nor compressive stress occurs when the spoke is subjected to bending in the circumferential direction is a neutral axis N1. A chain double-dashed line with a sign N2 is a neutral axis of each of the spokes 13A to 13F when they are bent in the axial direction. In each of the spokes 13A to 13F, a line of intersection between the transverse section and a neutral plane where neither tensile stress nor compressive stress occurs when the spoke is subjected to bending in the axial direction is a neutral axis N2.

In all of the spokes 13A to 13F, the neutral axis N1 when the spoke is bent in the circumferential direction is positioned forward in a rotating direction R with respect to the center line C1 in the circumferential direction. That is, in each of the spokes 13A to 13F, a distance Df from the neutral axis N1 to a fore end of the spoke in the rotating direction R is shorter than a distance Dr from the neutral axis N1 to a rear end of the spoke in the rotating direction R. The centers of gravity of the spokes 13A to 13F are positioned forward of the center line C1 in the rotating direction R. Transverse sections of the spokes 13A to 13F each have a shape asymmetric with respect to the center line C1.

Further, in all of the spokes 13A to 13F, the neutral axis N2 when the spoke is bent in the axial direction is positioned on the rotor body 11 side with respect to the center line C2 in the axial direction. That is, in each of the spokes 13A to 13F, a distance Dp from the neutral axis N2 to an end of the spoke on the rotor body 11 side is shorter than a distance Dd from the neutral axis N2 to an end on an opposite side to the rotor body 11. The centers of gravity of the spokes 13A to 13F are disposed at positions closer to the rotor body 11 than the center line C2 in the axial direction. Transverse sections of the spokes 13A to 13F each have a shape asymmetric with respect to the center line C2. Transverse sectional shapes of the spokes 13A to 13F are each asymmetric with respect to any line as an axis.

The spokes 13A, 13B, and 13D to 13F each have a transverse section in which a length in the axial direction substantially decreases as the transverse section extends rearward in the rotating direction R. Further, in the transverse section of each of the spokes 13A, 13B, and 13D to 13F, its length in the circumferential direction substantially decreases as the transverse section extends away from the rotor body 11 in the axial direction. That is, as a whole or approximately as a whole, the spokes 13A, 13B, and 13D to 13F each have a shape that tapers as the spoke extends rearward in the rotating direction R and tapers as the spoke extends toward an opposite side to the rotor body 11 in the axial direction.

The transverse sections of the spokes 13A to 13C are each defined with a plurality of lines, which form edges therebetween. In contrast, in the transverse sections of the spokes 13D and 13E, their lines are connected by curves. In the spoke 13F, a contour of its transverse section is constituted only by curves. That is, the spokes 13D to 13F each have a transverse sectional shape with no edges.

In the spokes 13A to 13E, their surfaces 133 on the rotor body 11 side are each linear as a whole in transverse section view. That is, the surfaces 133 of the spokes 13A to 13E on the rotor body 11 side are flat surfaces that are substantially perpendicular to the axial direction. In contrast, the surface 133 of the spoke 13F on the rotor body 11 side is curvilinear in transverse section view.

[Operation of Eddy Current Deceleration Device]

Figure 5:
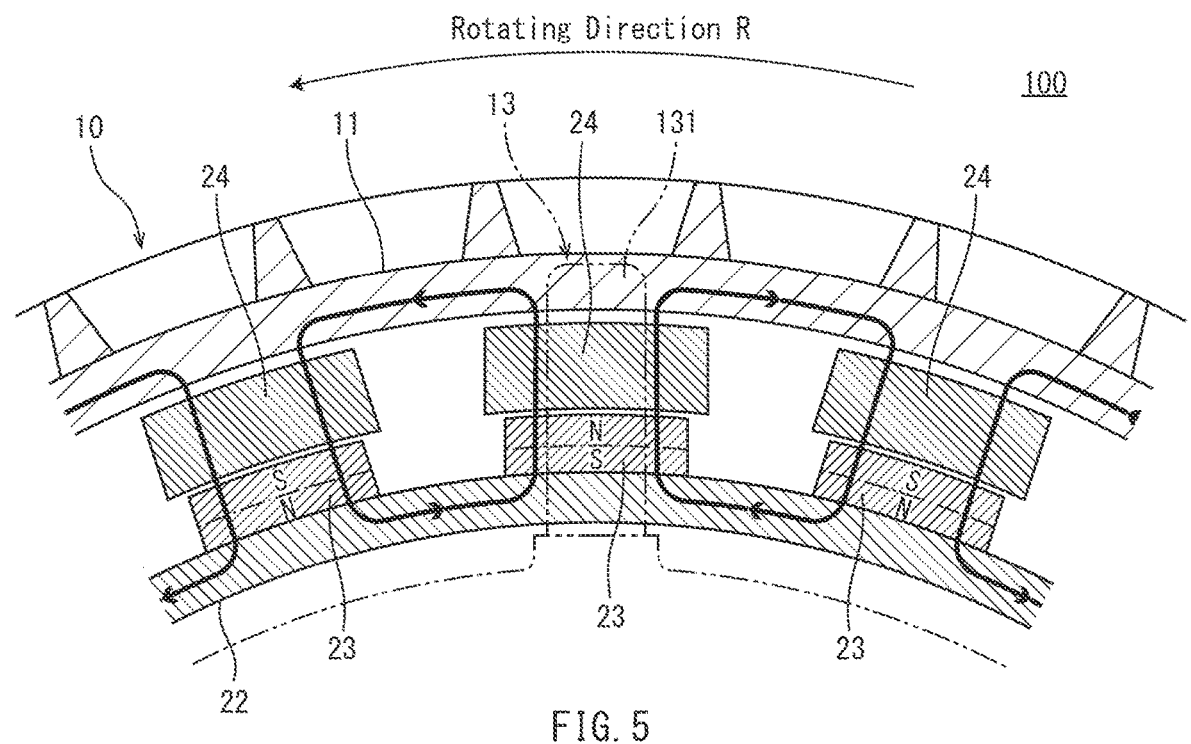
FIG. 5 is a schematic diagram for explaining a braking state of the eddy current deceleration device illustrated in FIG. 1 and FIG. 2.
Figure 6:
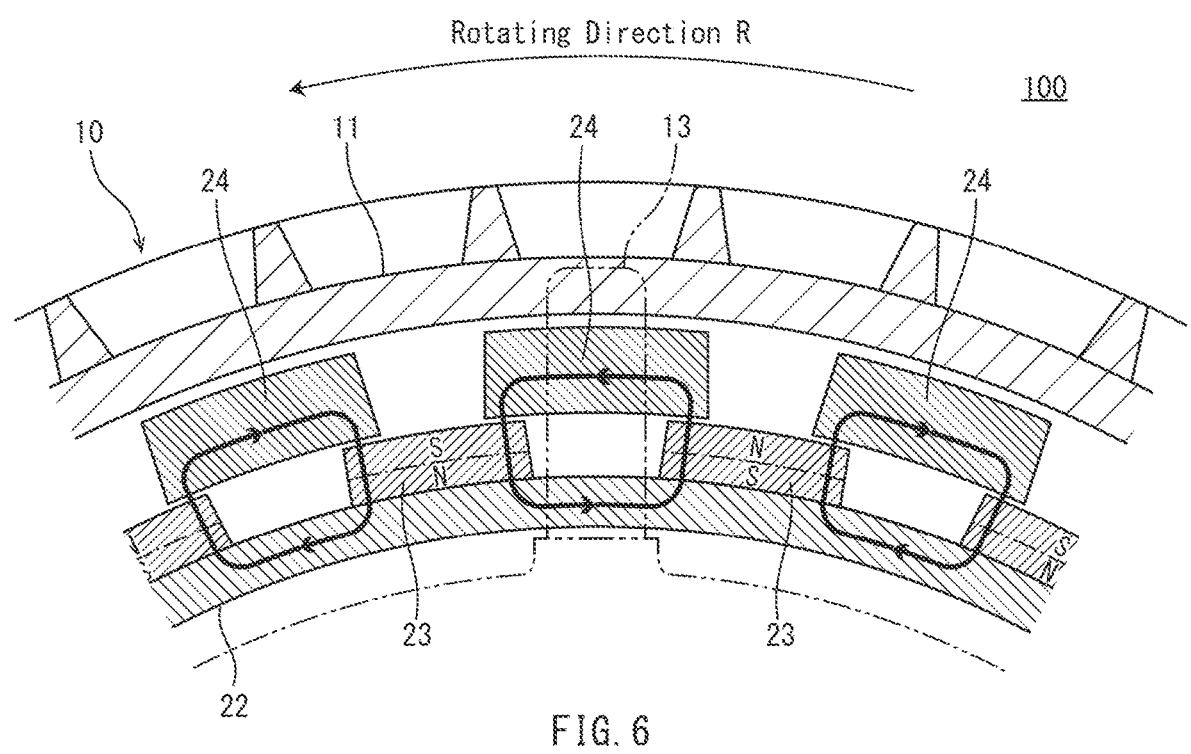
FIG. 6 is a schematic diagram for explaining a non-braking state of the eddy current deceleration device illustrated in FIG. 1 and FIG. 2.

With reference mainly to FIG. 5 and FIG. 6, operation of the deceleration device 100 will be described below. FIG. 5 and FIG. 6 are schematic diagrams for explaining a braking state and a non-braking state of the deceleration device 100, respectively.

(Braking State)

First, referring to FIG. 5, when the deceleration device 100 is in the braking state, the permanent magnets 23 are arranged immediately below the pole pieces 24. Therefore, magnetic fluxes from the permanent magnets 23 pass through the respective pole pieces 24 to reach the rotor body 11 rotating with the rotation shaft 200. This generates eddy currents on the inner peripheral surface of the rotor body 11. The eddy currents and magnetic fields produced by the permanent magnets 23 interact with each other to generate a braking force in an opposite direction to the rotating direction R in the rotor body 11. Further, as the eddy currents are generated, Joule's heat is produced in the rotor body 11, and a temperature of the rotor body 11 rises. This causes thermal expansion of the rotor body 11.

When the braking force in the opposite direction to the rotating direction R is generated in the rotor body 11, in each of the spokes 13 fixed to the rotor body 11, a bending load in the opposite direction to the rotating direction R (a bending load in the circumferential direction) is applied to the end portion 131 on the outer side in the radial direction.

When thermal expansion of the rotor body 11 occurs, of both end portions of the rotor body 11 in the axial direction, an end portion on a side where the end portion is not restrained by the spokes 13 significantly deforms outward in the radial direction when compared with an end portion on the spoke 13 side. That is, the rotor body 11 is subjected to such a deformation that an end portion of the rotor body 11 on an opposite side to the spokes 13 (on the back side of the paper of FIG. 5) warps outward in the radial direction. This applies a bending load to each spoke 13 such that the bending load pushes the end portion 131 on the outer side in the radial direction toward the opposite side to the rotor body 11 (a bending load in the axial direction).

With the application of the bending load in the circumferential direction, the spokes 13 are each subjected to such a bending deformation that each spoke 13 becomes convex forward in the rotating direction R. In each spoke 13, this causes a tensile stress to occur at its portion forward in the rotating direction R, with the neutral axis N1 as a boundary (in FIG. 4A to FIG. 4F), and causes a compressive stress to occur at its portion rearward. Further, with the application of the bending in the axial direction, the spokes 13 are each subjected to such a bending deformation that each spoke 13 becomes convex toward the rotor body 11 side in the axial direction. In each spoke 13, this causes a tensile stress to occur at its portion on the rotor body 11 side, with the neutral axis N2 as a boundary (in FIG. 4A to FIG. 4F), and causes a compressive stress to occur at its portion on an opposite side to the rotor body 11.

(Non-Braking State)

Referring to FIG. 6, when the deceleration device 100 is switched from the braking state to the non-braking state, the magnet holding member 22 rotates and the permanent magnets 23 are arranged such that each permanent magnet 23 overlaps adjacent pole pieces 24. In the non-braking state, magnetic circuits are formed among the magnet holding member 22, the permanent magnets 23, and the pole pieces 24, and magnetic fluxes from the permanent magnets 23 do not reach the rotor body 11. The braking force on the rotor body 11 is therefore released. In addition, the rotor body 11 that has received thermal expansion is gradually cooled to be in the original cylindrical shape. Accordingly, the bending loads in the circumferential direction and the axial direction to each spoke 13 and the tensile stresses and the compressive stresses in each spoke 13 are removed.

Advantageous Effect

In the eddy current deceleration device 100 according to the present embodiment, the spokes 13 connecting the rotor body 11 to the hub 12 each have the neutral axis N1 when the spoke is bent in the circumferential direction. When the braking force is generated in the rotor body 11, applying the bending load in the circumferential direction to each spoke 13, a tensile stress occurs at its portion forward in the rotating direction R, with the neutral axis N1 as the boundary, and a compressive stress occurs at its portion rearward. Absolute values of these stresses increase with increases in distances from the neutral axis N1.

In the present embodiment, the neutral axis N1 is arranged forward in the rotating direction R with respect to the center line C1 in the circumferential direction of each spoke 13. Therefore, in each spoke 13, the distance Df from the neutral axis N1 to the fore end of the spoke in the rotating direction R is shorter than the distance Dr from the neutral axis N1 to the rear end of the spoke in the rotating direction R. This enables a reduction in a maximum value of the tensile stress when each spoke 13 receives the bending load in the circumferential direction.

In the present embodiment, the spokes 13 each further have the neutral axis N2 when the spoke is bent in the axial direction. When the bending load in the axial direction is applied to each spoke 13 due to the thermal expansion of the rotor body 11, a tensile stress occurs at its portion on the rotor body 11 side with the neutral axis N2 as a boundary, and a compressive stress occurs at its portion on an opposite side to the rotor body 11. Absolute values of these stresses increase with increases in distances from the neutral axis N2.

In the present embodiment, the neutral axis N2 is arranged on the rotor body 11 side with respect to the center line C2 of each spoke 13. Therefore, in the axial direction, the distance Dp from the neutral axis N2 to the end of the spoke on the rotor body 11 side is shorter than the distance Dd from the neutral axis N2 to the end on an opposite side to the rotor body 11. This enables a reduction in a maximum value of the tensile stress when each spoke 13 receives the bending load in the axial direction.

In the present embodiment, when each spoke 13 receives the bending loads in the circumferential direction and the axial direction, a maximum value of the tensile stress occurring in the spoke 13 is decreased, whereas a maximum value of the compressive stress is increased. However, repetitive compressive stresses are less likely to cause fatigue damage to the spoke 13 compared with repetitive tensile stresses. Therefore, by decreasing maximum values of tensile stresses occurring in the spoke 13, fatigue damage to the spoke 13 can be prevented or reduced even when maximum values of compressive stresses are increased in exchange for the decrease.

Figure 7A:
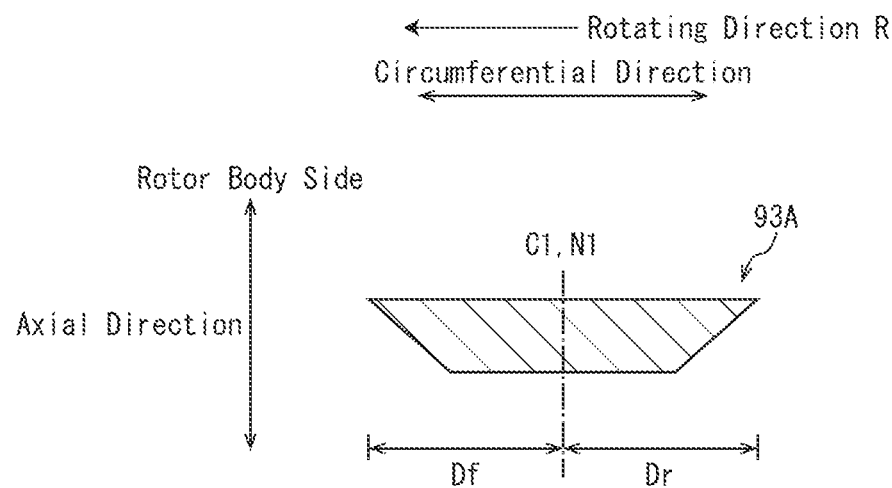
FIG. 7A is a diagram exemplifying a transverse sectional shape of a conventional spoke.
Figure 7B:
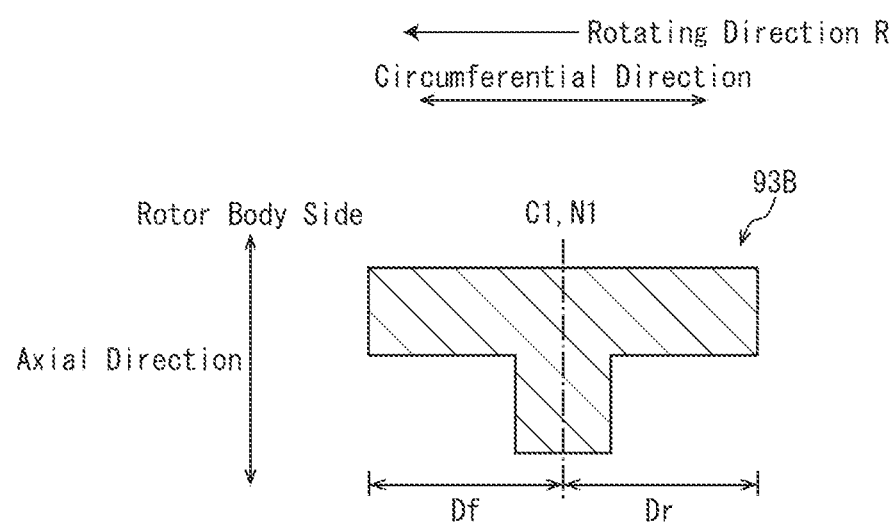
FIG. 7B is a diagram exemplifying a transverse sectional shape of a conventional spoke.
Figure 7C:
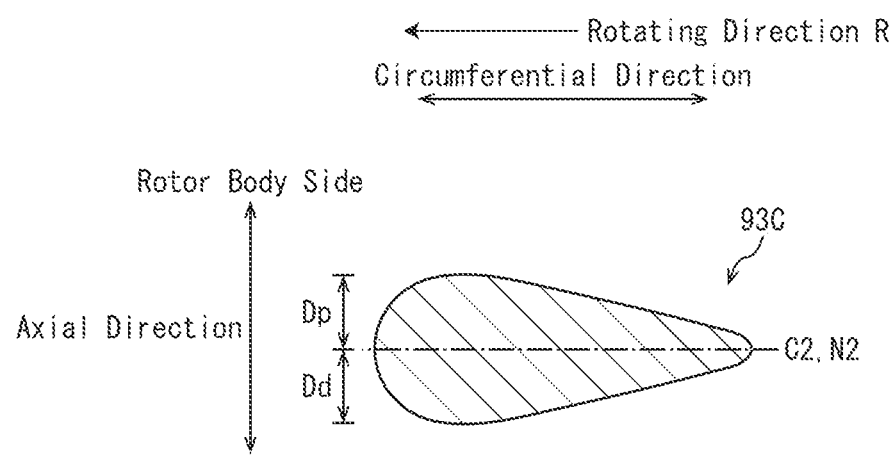
FIG. 7C is a diagram exemplifying a transverse sectional shape of a conventional spoke.

For reference purposes, a transverse sectional shape of a conventional spoke is illustrated in FIG. 7A to FIG. 7C as an example. In spokes 93A and 93B illustrated in FIG. 7A and FIG. 7B, respectively, a neutral axis N1 when the spoke is bent in a circumferential direction coincides with a center line C1. Therefore, in each of the spokes 93A and 93B, a distance Df from the neutral axis N1 to a fore end of the spoke in a rotating direction R is equal to a distance Dr from the neutral axis N1 to a rear end of the spoke in the rotating direction R. In this case, a maximum value of a tensile stress that occurs when each of the spokes 93A and 93B is bent in the circumferential direction is equal to a maximum value of a compressive stress occurring then. That is, a transverse sectional shape of each of the spokes 93A and 93B does not reduce the tensile stress caused by a bending load in the circumferential direction.

In a spoke 93C illustrated in FIG. 7C, a neutral axis N2 when the spoke is bent in an axial direction coincides with a center line C2. Therefore, in the spoke 93C, a distance Dp from the neutral axis N2 to an end of the spoke on a rotor body side in the axial direction is equal to a distance Dd from the neutral axis N2 to an end on an opposite side to the rotor body in the axial direction. In this case, a maximum value of a tensile stress that occurs when the spoke 93C is bent in the axial direction is equal to a maximum value of a compressive stress occurring then. That is, a transverse sectional shape of the spoke 93C does not reduce the tensile stress caused by a bending load in the axial direction.

In contrast to such conventional spokes, for the spokes 13 in the present embodiment, with consideration given to both a bending load in the circumferential direction and a bending load in the axial direction, a transverse sectional shape capable of reducing a tensile stress caused by bending in the circumferential direction and a tensile stress caused by bending in the axial direction at the same time is adopted. Therefore, fatigue damage to the spokes 13 can be prevented or reduced effectively, and a fatigue life of the spokes 13 can be prolonged. As a result, a durability of the deceleration device 100 of an eddy current type including the spokes 13 can be improved.

According to the present embodiment, fatigue damage to the spokes 13 can be prevented or reduced only by designing the transverse sectional shapes of the spokes 13, without increasing an area of a transverse section of each spoke 13 and a weight of the spoke 13. With the spokes 13 resisting fatigue damage, the spokes 13 can be reduced in size, or the number of the spokes 13 provided in the eddy current deceleration device 100 can be decreased. This enables the eddy current deceleration device 100 to be reduced in size and weight, and thus mountability of the eddy current deceleration device 100 in a vehicle can be improved. Further, this enables an increase in fuel efficiency of a vehicle in which the eddy current deceleration device 100 is mounted.

In the present embodiment, each spoke 13 has a transverse sectional shape that makes the spoke 13 resistant to fatigue damage even when bending loads in the circumferential direction and the axial direction are repeatedly applied to the spoke 13 due to a braking force generated in the rotor body 11 and thermal expansion of the rotor body 11. Therefore, the eddy current deceleration device 100 with the spoke 13 can be made to generate a high braking force.

In the present embodiment, the surfaces 133 of the spokes 13A to 13E on the rotor body 11 side illustrated in FIG. 4A to FIG. 4E as examples are flat surfaces that are substantially perpendicular to the axial direction. This allows the spokes 13 to be brought close to the stator 20 disposed inside the rotor body 11, enabling a reduction in dimension of the eddy current deceleration device 100 in the axial direction.

In the present embodiment, the spokes 13A, 13B, and 13D to 13F illustrated in FIG. 4A, FIG. 4B, and FIG. 4D to FIG. 4F as examples each have a transverse section in which a length in the axial direction decreases as the transverse section extends rearward in the rotating direction R. In this case, while the rotor 10 rotates, air flows flowing rearward in the rotating direction R on surfaces of the spokes 13A, 13B, and 13D to 13F are resistant to being separated from the surfaces. As a result, air resistance of the rotor 10 can be reduced.

In particular, the spokes 13D to 13F each have a transverse sectional shape with no edges. This enables a further reduction in air resistance of the rotor 10.

An embodiment according to the present disclosure is described above, but the present disclosure is not limited to the above embodiment, and various modifications can be made without departing from the scope of the present disclosure.

In the embodiment described above, the surfaces 133 of the spokes 13A to 13E on the rotor body 11 side are surfaces that are substantially flat. However, the shape of the surface 133 of each spoke 13 is not limited to a substantially flat surface. For example, the surface 133 of the spoke 13 may be a curved surface that is convex toward the rotor body 11 side or may be a curved surface that is concave in the opposite direction.

In the embodiment described above, the stator 20 is disposed inside the rotor body 11 in the radial direction. However, the stator 20 may be disposed outside the rotor body 11 in the radial direction.

In the embodiment described above, the rotor 10 including the spokes 13 is used in the eddy current deceleration device 100 of a permanent magnet type. However, the rotor 10 can also be used in an eddy current deceleration device of an electromagnetic type. That is, electromagnets can be provided in the deceleration device 100 in place of the magnet holding member 22, the permanent magnets 23, the pole pieces 24, and the like. When each transverse sectional shape for the spokes 13 in the embodiment described above is adopted, a structure of the stator 20 is not limited to a particular structure.

REFERENCE SIGNS LIST

100: eddy current deceleration device
10: rotor
11: rotor body
12: hub
13, 13A to 13F: spoke
20: stator
200: rotation shaft
N1, N2: neutral axis
C1, C2: center line

The invention claimed is:

1. An eddy current deceleration device comprising:
a rotor that includes a hub attached to a rotation shaft, a rotor body having a cylindrical shape, and a spoke extending from the hub to the rotor body and being fixed to one end portion of the rotor body in an axial direction, the rotor being configured to rotate with the rotation shaft; and
a stator that is disposed inside or outside of the rotor body, wherein
the spoke includes:
a first neutral axis that is positioned forward in a rotating direction of the rotor with respect to a center line of the spoke in a circumferential direction of the rotor body, the first neutral axis being a neutral axis when the spoke is bent in the circumferential direction; and
a second neutral axis that is positioned on a rotor body side with respect to a center line of the spoke in the axial direction, the second neutral axis being a neutral axis when the spoke is bent in the axial direction.

2. The eddy current deceleration device according to claim 1, wherein a surface of the spoke on the rotor body side is a flat surface that is perpendicular to the axial direction.

3. The eddy current deceleration device according to claim 2, wherein the spoke has a transverse section in which a length in the axial direction decreases as the transverse section extends rearward in the rotating direction.

4. The eddy current deceleration device according to claim 1, wherein the spoke has a transverse section in which a length in the axial direction decreases as the transverse section extends rearward in the rotating direction.

* * * * *